(12) United States Patent
Köster

(10) Patent No.: US 8,907,271 B2
(45) Date of Patent: Dec. 9, 2014

(54) INTRODUCTION OF IONS INTO ELECTROSTATIC ION TRAPS

(75) Inventor: Claus Köster, Lilienthal (DE)

(73) Assignee: Bruker Daltonik, GmbH, Bremen (DE)

( * ) Notice: Subject to any disclaimer, the term of this patent is extended or adjusted under 35 U.S.C. 154(b) by 0 days.

(21) Appl. No.: 13/559,006

(22) Filed: Jul. 26, 2012

(65) Prior Publication Data

US 2013/0037711 A1    Feb. 14, 2013

(30) Foreign Application Priority Data

Aug. 10, 2011  (DE) .......................... 10 2011 109 927

(51) Int. Cl.
 *H01J 49/26* (2006.01)
 *H01J 49/42* (2006.01)
(52) U.S. Cl.
 CPC ............. *H01J 49/4245* (2013.01); *H01J 49/42* (2013.01); *H01J 49/26* (2013.01)
 USPC ........... 250/283; 250/281; 250/282; 250/291; 250/290; 250/288
(58) Field of Classification Search
 CPC ............................ H01J 49/425; H01J 49/4245
 See application file for complete search history.

(56) References Cited

U.S. PATENT DOCUMENTS

| | | | |
|---|---|---|---|
| 5,886,346 A | 3/1999 | Makarov | |
| 7,994,473 B2 | 8/2011 | Koster | |
| 8,319,180 B2 * | 11/2012 | Nikolaev et al. | 250/290 |
| 2004/0079874 A1* | 4/2004 | Bateman et al. | 250/281 |
| 2006/0076484 A1* | 4/2006 | Brown et al. | 250/290 |
| 2009/0294656 A1* | 12/2009 | Koster | 250/283 |
| 2010/0301204 A1* | 12/2010 | Koster et al. | 250/283 |

FOREIGN PATENT DOCUMENTS

GB    2448413 A   * 10/2008

OTHER PUBLICATIONS

Marto et al., "Ion Trajectories in an Electrostatic Ion Guide for External Ion Source Fourier Transform Ion Cyclotron Resonance Mass Spectrometry", J Am Soc Mass Spectrom 1995, 6, 936-946.*

* cited by examiner

*Primary Examiner* — Jack Berman
*Assistant Examiner* — James Choi
(74) *Attorney, Agent, or Firm* — Robic, LLP

(57) ABSTRACT

Ions are introduced into a Kingdon ion trap in which the ions can oscillate harmonically in a potential well in the longitudinal direction, essentially decoupled from their transverse motion by a Kingdon ion guide, which can consist of a drill-hole through the wall of the ion trap housing electrodes and a central wire. An injection potential is first applied to the wire, but once the heaviest ions of interest have been injected into the trap, the potential of the wire is switched to the potential of the housing electrodes, to trap the ions in the trap. The ions introduced into the Kingdon ion trap may come from a small ion cloud, located in a Paul trap.

18 Claims, 3 Drawing Sheets

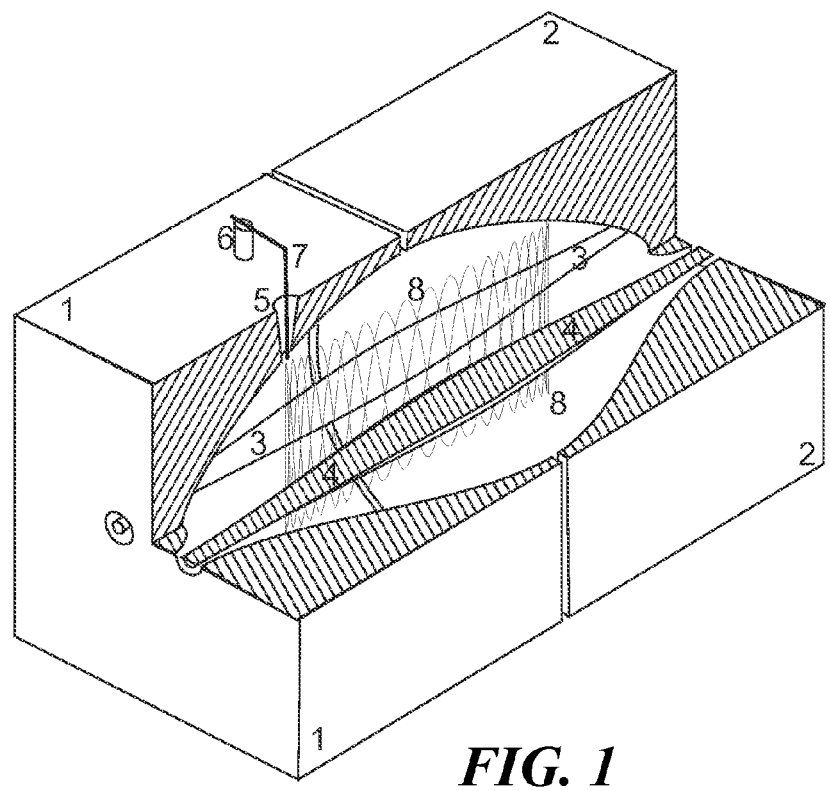
FIG. 1
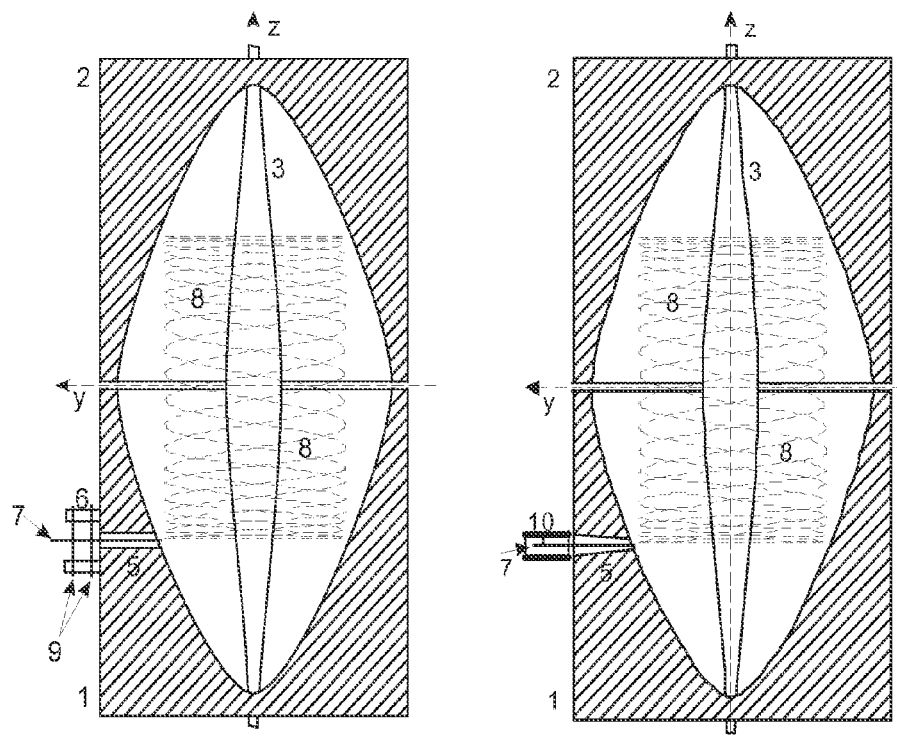
FIG. 2  FIG. 3

INTRODUCTION OF IONS INTO ELECTROSTATIC ION TRAPS

BACKGROUND

The invention relates to devices and methods for the introduction of ions into electrostatic ion traps (Kingdon ion traps), in whose internal DC field the ions can oscillate harmonically in a potential well in the longitudinal direction, essentially decoupled from their transverse motion. Mass spectrometers can only ever determine the ratio of the ion mass to the charge of the ion. In the following, the term "mass of an ion" or "ion mass" always refers to the ratio of the mass m to the number z of positive or negative elementary charges of the ion, i.e. the elementary charge related mass m/z (or charge-related mass, for short). Various criteria determine the quality of a mass spectrometer, the main ones being the mass resolution and the mass accuracy. The mass resolution is defined as $R=(m/z)/\Delta(m/z)=m/\Delta m$, where R is the resolving power, m the mass of an ion, measured in units of the mass scale, and $\Delta m$ the width of the mass signal at half maximum, measured in the same units.

Kingdon ion traps are electrostatic ion traps in which ions can orbit around one or more inner electrodes or oscillate between several inner electrodes. An outer, enclosing housing is at a DC potential, which ions with a predetermined sum of kinetic and potential energy cannot reach. In particular, it is possible to use Kingdon ion traps as electrostatic ion guides. To this end, an inner wire electrode must be surrounded by an outer electrode in the form of an enveloping tube with open ends. These Kingdon ion guides may compete with the better known RF multipole ion guides, which are based on the effect of pseudopotentials generated by RF voltages. In contrast to these, Kingdon ion guides convey ions of all masses in the same way, i.e. they do not have lower or upper limits for ion masses. Kingdon ion guides should be operated under ultra-high vacuum in order not to lose any ions, while RF ion guides are usually operated at vacuum pressures in the range of $10^{-2}$ to 10 pascal.

In special Kingdon ion traps, which are particularly suitable as mass spectrometers, the outer electrodes have the form of almost closed housing electrodes; the inner surfaces of the housing electrodes and the outer surfaces of the inner electrodes are designed so that, firstly, the motions of the ions in the longitudinal direction of the Kingdon ion trap are decoupled from their motions in the transverse direction as completely as possible and, secondly, a parabolic potential well in the longitudinal direction is generated in which the ions can oscillate harmonically. The oscillation frequency depends on the charge-related mass m/z of the ions.

Kingdon ion traps can be designed in which the ions can swing transversely in a center plane between one or more pairs of inner electrodes, as described in detail in document U.S. Pat. No. 7,994,473 B2 (C. Köster; GB 2448413 B; DE 10 2007 024 858 B4). In the text below, these ion traps will be called "Kingdon swing ion traps", or "swing traps" for short. Kingdon ion traps of the Orbitrap® type (Thermo-Fisher Scientific), as disclosed in the patent specification U.S. Pat. No. 5,886,346 (A. Makarov), can also be used, however; they are referred to as "Kingdon orbit ion traps", or "orbit traps" for short, in this description because the ions orbit around the single inner electrode.

In the present document, the term "Kingdon ion trap" refers only to these special types in which ions can oscillate harmonically in the longitudinal direction, essentially decoupled from their motions in transverse direction. They can be used as mass spectrometers by measuring the harmonic oscillations of the ions in the longitudinal direction with the aid of the image currents influenced by the ion movements in suitable electrodes, for example in split housing electrodes. From the image current transients, the oscillation frequencies of the ions are determined by Fourier transformation. From the ion oscillation frequencies, the masses can be calculated. Thus these types of mass spectrometer, as also ion cyclotron resonance mass spectrometers (ICR-MS), belong to the general group of Fourier transform mass spectrometers (FTMS).

In the document US-2010-0301204-A1 (C. Koester and J. Franzen; GB 2470259 A; DE 10 2009 020 886 A1) which is incorporated herein by reference in its entirety, Kingdon ion traps of this category are described in detail and, in particular, devices and methods for the introduction of ions in such Kingdon ion traps are also disclosed. The advantages of the Kingdon ion traps, which particularly consist in a very high mass resolution, are also described. However, the high mass resolution can only be achieved if the operating voltage between inner and housing electrodes can be kept extremely stable, accurate to better than $10^{-6}$ over measuring times of at least several seconds. This voltage stability can best be maintained when the voltage does not have to be switched or changed in any way during operation.

For all Kingdon ion traps it is advantageous to inject the ions in the longitudinal direction at a location outside the potential minimum. The injected ions then immediately start to swing not only in the transverse x-y direction, but to oscillate also in the longitudinal direction z, without specially having to be excited to these oscillations. The z-position of the injection location of the ions determines the reversal points of the longitudinal oscillations. Thus, a special voltage generator is not required for the excitation of these oscillations in the longitudinal direction, i.e. no generator for "chirp" or "synch pulses", as is required for the excitation of the ions in ICR mass spectrometers.

The method of introducing ions into the Kingdon ion trap according to the cited document US-2010-0301204-A1 consists in equipping the Kingdon ion traps with an electrically insulated entrance tube, which completely surrounds the ions during their introduction and guides them through the housing. This means that the ions can be introduced with a kinetic energy and at a potential which does not allow them to reach the housing electrodes of the Kingdon ion trap during their motions after they have been introduced. The only point of the housing which they can reach again after executing a number of oscillations is the introduction tube, as long as it is still switched to the potential for the introduction of the ions. A voltage generator can switch the entrance tube to different potentials. If the potential of the tube is switched back to a potential which roughly corresponds to the potential of the housing electrodes, the ions keep moving on their oscillation trajectories: they are trapped for ever until being released at will. The tube thus acts as an entrance gate which can be closed.

To introduce the ions, they are first collected outside the Kingdon ion trap, favorably in as small a cloud as possible, and then accelerated to form an ion beam which is decelerated before the Kingdon ion trap, and injected with reduced kinetic energy, while the entrance gate is open. This process of ion transfer from the cloud to the Kingdon ion trap causes a mass dispersion, however: the light ions arrive in the ion trap earlier than the heavy ions. The ion introduction process therefore takes a certain time from the arrival of the lightest ions to the arrival of the heaviest ions of interest. The entrance gate must remain open for this period, i.e. the tube must remain at the introduction potential for ions.

There is a distinct danger that light ions will find their way back to the tube and be discharged at the walls of the tube before the heaviest ions have arrived. All ions move on the same trajectories, independently of their mass. As described in the cited document US-2010-0301204-A1, by selecting an advantageous ratio of a characteristic length to the diameter of the Kingdon ion trap (the "aspect ratio"), it is possible to ensure that the introduced ions can only return to the opening of the entrance tube after several longitudinal oscillation cycles, preferably after about three to ten oscillations. If they return from the intermediate longitudinal oscillations, their transverse position should be located in some distance from the entrance tube. The aspect ratio determines the ratio of the number of transverse oscillation cycles to a longitudinal oscillation cycle. With a favorable aspect ratio, it is possible to extend the time until the lightest ions return to the tube so that even the heaviest ions of the range of interest have entered the Kingdon ion trap.

The tube is also disadvantageous, however. In order to pass a tube with a sufficiently large inside diameter and sufficiently sturdy wall thickness through the housing electrodes, and to allow for the tube to be insulated, the hole in the housing wall must be quite large. This means that the disturbance of the field inside the Kingdon ion trap becomes quite large. Furthermore, it is difficult to send an ion beam with relatively low kinetic energy through a narrow tube so that few ions are lost in the tube by wall contacts. Therefore, there is still a need for a switchable entrance gate for a Kingdon ion trap with minimized ion losses and perturbing effects on the field distribution inside the Kingdon ion trap, and corresponding introduction methods.

SUMMARY

In accordance with the principles of the invention, an electrostatic Kingdon ion guide is used to introduce the ions into the electrostatic Kingdon ion traps. As has been described above, a Kingdon ion guide consists of an inner electrode, for example a thin wire, in a surrounding tube. The wire is maintained at an ion-attracting potential, and the surrounding tube has a potential which the ions cannot reach due to their low kinetic energy. In the transverse direction, the ions tumble about the wire. They can only touch the wire if their original direction on entering the Kingdon ion guide happened to be aligned precisely toward the wire; the losses are very low, however.

To introduce the ions into the Kingdon ion trap, a drill-hole through one of the outer electrodes serves as the surrounding tube of the Kingdon ion guide and a thin wire in this drill-hole as the central Kingdon electrode. The drill-hole can also taper slightly in a conical form. A voltage generator can switch the wire to different potentials and thus open and close the entrance gate. As described in the document US-2010-0301204-A1, by selecting an advantageous ratio of a characteristic length to the diameter of the Kingdon ion trap ("aspect ratio"), it is possible to ensure that the introduced ions can only return to the entrance gate, also in their transverse position, after several longitudinal oscillations, preferably after about three to ten oscillations.

In swing traps, the drill-hole is located approximately in the center plane between the inner electrodes, i.e. in the plane in which the ions will swing in the transverse direction, and points toward the axis of the swing trap. In orbit traps, the drill-hole passes through a half-shell of the housing electrodes approximately tangentially to the desired orbital motion of the ions.

The ion introduction method starts favorably with the generation of a small ion cloud. The method first accelerates the ions of the ion cloud, decelerates them again in front of the drill-hole with the wire in a suitable ion-optical arrangement, and injects them with a suitable kinetic energy through the drill-hole and into the Kingdon ion trap. If the potential of the original ion cloud is lower than the potential of the Kingdon trap housing electrodes, the ions cannot touch the walls of the drill-hole through the housing electrodes nor can they touch the walls of the outer housing electrodes once they are introduced. The wire within the tube has to be at a potential between the potential of the housing electrodes and that of the inner electrodes. Outside the housing electrodes, the wire may also be surrounded by a tube at a suitable potential. A permanently magnetic tube is particularly suitable. In order to minimize ion losses, the decelerating ion-optical arrangement focuses the ions with a slight inclination onto a point slightly adjacent to the wire. After the introduction of the ions has been concluded, the potential of the wire is switched back to a potential which is essentially that of the housing electrode, and the entrance gate is thus closed.

If the Kingdon ion trap is to be emptied again after the longitudinal oscillations have been measured, this can be achieved by a suitable ejection potential at the wire or at a special extraction electrode. This operating mode with filling and emptying results in an advantageous operation with the voltage between inner and outer electrodes being permanently constant, which makes it easier to maintain the required potential difference with a constancy of better than $10^{-6}$.

BRIEF DESCRIPTION OF THE DRAWINGS

FIG. 1 is a three-dimensional schematic drawing of an electrostatic Kingdon ion trap of the swing type with a housing electrode split into two half-shells (1) and (2), and two spindle-shaped inner electrodes (3, 4). The Kingdon ion guide according to the invention consists of a wire (7) in a drill-hole (5) through the half-shell (1). The end of the wire extends as far as the interior surface of the half-shell (1); more favorably it protrudes a few tenths of a millimeter further through the surface. Trajectories (8) of the ions inside the Kingdon ion trap in a center plane between the two inner electrodes show the combination of the swing motions in transverse direction, and the harmonic oscillations in z direction.

FIG. 2 is a schematic cross-section of the Kingdon ion trap from FIG. 1 in a y-z-plane. The trajectories (8) of stored ions which are swinging in the transverse y-direction and oscillating harmonically in the longitudinal z-direction are shown schematically as a projection onto the plane of the image. This arrangement differs slightly from FIG. 1 in that the introduction wire (7) here is fastened to two insulating posts (6) with two thin transverse wires (9) and extends into the drill-hole (5).

FIG. 3 shows an identical swing ion trap, except that here the wire (7) is surrounded by a tube (10) before the housing. Furthermore, the drill-hole (5) has a slightly conical shape here. As is shown in the illustration, the tube (10) can have the same potential as the wire (7); but it is also possible to apply different potentials to wire (7) and tube (10). If the tube (10) is made of permanently magnetic material, there is a magnetic fringe field at the entrance aperture which provides the ions entering with a slight rotational motion about the axis of the tube: this twist of the ion cloud as it enters prevents the ions from reaching the wire (7); instead they circle around it.

DETAILED DESCRIPTION

Figure 4:
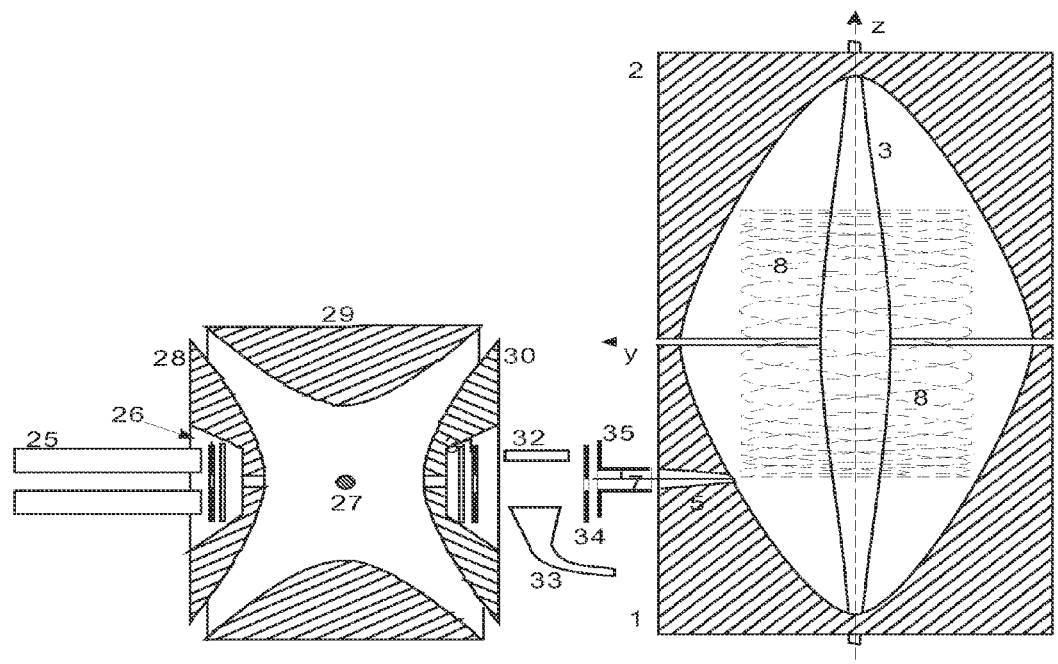
FIG. 4 again shows the schematic of an identical swing ion trap, but in this case coupled to a three-dimensional Paul RF ion trap which, as is usual for qualitatively highly developed Paul ion traps, comprises two rotationally hyperbolic end cap electrodes (28, 30) and a rotationally hyperbolic ring electrode (29). Ions can be introduced via the RF quadrupole ion guide (25) and the ion lens (26) into the interior of the Paul ion trap, where they are formed into a small ion cloud (27) by a damping gas which damps the oscillating motions of the introduced ions. By switching on an extraction voltage at the end cap electrode (30), the ions of the ion cloud (27) can be extracted from the Paul ion trap and focused, then accelerated to form an ion beam by the lens (31) and decelerated again by the lenses (34, 35), and introduced with the aid of the introduction wire (7) through the drill-hole (5) and into the swing ion trap. The lens diaphragm (35) transitions into a tube which surrounds the wire (7), while the first lens diaphragm (34) is directed onto a point adjacent to the wire (7) in order to keep ion losses low. The conversion dynode (32) and the secondary electron multiplier (33) mean that the Paul ion trap can also be operated in the usual way as an independent mass spectrometer, albeit with a much lower mass resolution than that of the Kingdon ion trap.

The invention is based on Kingdon ion traps in which ions can oscillate harmonically in the longitudinal direction, predominantly decoupled from any type of motion in the transverse direction. Kingdon ion traps are electrostatic ion traps; between their housing electrodes and the inner electrodes, a highly constant operating voltage ΔU of several kilovolts generates an electric field in which the ions move.

As has already been described above, two types of such Kingdon ion traps are known. In one type, the "swing trap" (FIGS. 1 to 4), the ions can swing transversely in a center plane between one or more pairs of inner electrodes, as described in detail in the patent specification U.S. Pat. No. 7,994,473 B2 (C. Köster; GB 2448413 B; DE 10 2007 024 858 B4). The other type consists of Kingdon ion traps of the Orbitrap® type, as have been disclosed in the patent specification U.S. Pat. No. 5,886,346 (A. A. Makarov) (FIGS. 5 and 6), and which are called "orbit traps" for short in this description because the ions orbit around the inner electrode here.

The invention proposes to use an electrostatic Kingdon ion guide to introduce the ions into these types of Kingdon ion trap. As has been described above, a Kingdon ion guide consists of a thin wire in a surrounding tube, where the wire is maintained at an ion-attracting potential, and the tubular surrounding has a potential which the ions cannot reach due to the sum of their potential and kinetic energy. In the transverse direction, the ions tumble about the wire; in the longitudinal direction they retain their injection speed. They can only touch the wire if their original direction as they enter the Kingdon ion guide happened to be aligned precisely toward the wire; as experiments and simulations show, the losses can be kept very low.

As can be seen from FIGS. 1 to 4, to introduce the ions into the Kingdon ion trap, a drill-hole (5) through the outer electrode (1) serves as the surrounding tube, and a thin wire (7) in this drill-hole as the central Kingdon electrode. A voltage generator can switch the wire (7) to different potentials and thus opens and closes the entrance gate. Inside the Kingdon trap, the ions move all on the same trajectories (8), independently of their mass. As described in the document US-2010-0301204-A1, by selecting an advantageous ratio of a characteristic length to the diameter of the Kingdon ion trap (the "aspect ratio"), it is possible to ensure that the introduced ions can only return to the entrance gate, in both their longitudinal and transverse position simultaneously, after several longitudinal oscillation cycles, preferably after about three to ten oscillation cycles. This is the only place they can leave the Kingdon trap, either being discharged by contact with the wire, or by being sucked out of the trap by the wire's electrical potential.

Since the distance through the housing wall is only a few millimeters, the wire (7) in the drill-hole does not have to be very long. It is expedient, however, to already use the wire (7) outside the housing wall (1) to guide the ions. It can be surrounded by a tube (10) outside the housing, with the tube (10) being at a suitable potential. The wire (7), which is preferably round, can be very thin, preferably around one tenth of a millimeter; the diameter can be chosen between about 0.05 and 0.3 millimeters. The wire should be made of a hard metal, such as a hard-drawn steel wire; but other materials can also be used for the wire, particularly if all magnetic influences are to be avoided. The drill-hole (5) in the housing wall can have a diameter of 0.5 to 1.5 millimeters; a conical drill-hole can be favorable here (FIG. 3), which tapers from 1.5 to 0.7 millimeters, for example, and thus additionally focuses the injection of the ions. A trumpet-shaped tapering is also possible.

If a short tube (10) outside the housing is used, it can be advantageous to manufacture it from permanently magnetic material. A magnetic leakage field with radial field components, which provides the ions with a slight rotational motion around the wire (7), is generated in the entrance region. They then tumble about the wire and thus cannot reach it. The radial components of the magnetic field can be enhanced further if the wire is also made of a magnetizable material.

The ion losses are also kept low if the ion beam is focused by the ion-optical lenses onto a point adjacent to the wire and, furthermore, injected at a slight angle so that only very few ions move in the direction toward the wire.

Outside the housing, the wire (7) can run at an angle to an insulating holder (6), as can be seen in FIG. 1; it can also be securely held by one or more transverse wires (9), as in FIG. 2. The transverse wires (9) cause a slight loss of ions, but this can be tolerated; the transverse wires (9) also have a positive effect, however, because they provide the ions flying past with a slight deflection, which causes them to tumble around the wire (7). The wire (7) protrudes, electrically insulated, through the drill-hole (5) in the outer housing electrode (1). The position of the tip of the wire should be optimized experimentally; it may be shorter than the drill-hole or may project by around one to two tenths of a millimeter into the interior of the Kingdon ion trap. The position of the wire's tip and the potential of the wire during the measurement phase should be optimized in such a way that the potential perturbation in the interior of the Kingdon ion trap caused by the drill-hole (5) and the wire (7) can be minimized for the measurement phase.

Figure 5:
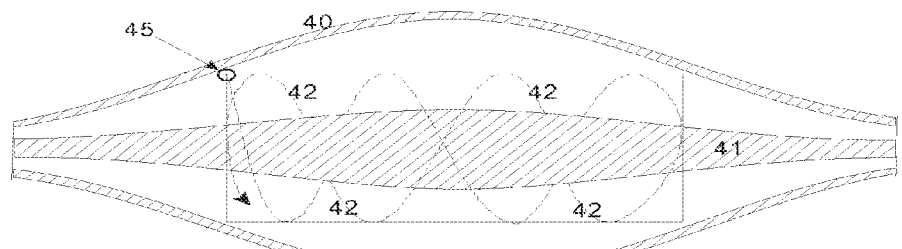
FIG. 5 depicts a schematic of a Kingdon orbit ion trap with housing electrodes (40), single inner electrode (41) and orbiting ion trajectories (42). The ions are introduced through the drill-hole (45), which has been formed into a Kingdon ion guide by a central wire (not visible).
Figure 6:
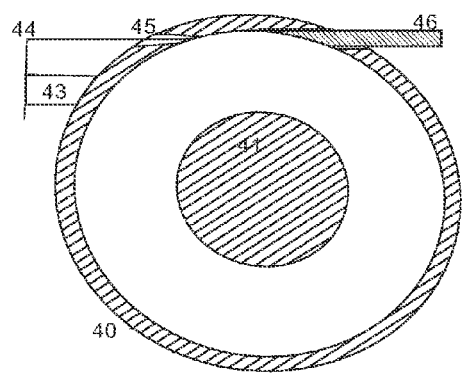
FIG. 6 depicts a cross-section through the Kingdon orbit ion trap according to FIG. 5, where drill-hole (45) and wire (44) can be seen. The wire is fixed on an insulating post (43). The drill-hole (45) has a slightly conical shape here.

Analogously, a drill-hole (45) with a wire (44), as depicted in FIGS. 5 and 6, serves to introduce ions into Kingdon orbit ion traps.

In swing traps such as those in FIGS. 1 to 4, the drill-hole (5) with the wire (7) can be located in the center plane between the two inner electrodes (3) and (4), i.e. in the plane in which the ions will swing in the transverse direction, and can point toward the axis of the swing trap. The plane in which an ion swings in the transverse direction is not completely fixed, however, but can itself advantageously oscillate slightly in a rotation about the z-axis of the Kingdon ion trap. Therefore, a slight deviation of the drill-hole (5) from the center plane in the x-direction can be advantageous to increase the time the ions need to return to the position of the wire (7) in the drill-hole (5). In orbit traps such as those in FIGS. 5 and 6, the drill-hole (45) should pass through one half-shell of the housing electrodes (40) in a direction at approximately a tangent to the desired orbital motion of the ions. In both cases, the wire for closing and opening the entrance gate can be brought to the approximate potential of the housing electrodes, on the one hand, and to an intermediate potential that is five to thirty percent closer to the potential of the inner electrodes, on the other hand. It is advantageous here that the thin wire provides little capacitive coupling to the housing electrodes, whose potential is only slightly disturbed by this switching.

We shall first describe in more detail here an embodiment utilizing a swing trap, in which the ions can swing transversely in a center plane between one or more pairs of inner electrodes, and which has a potential well in the longitudinal direction for harmonic oscillations of the ions; the transverse and longitudinal oscillations are decoupled by the form of the inner and outer electrodes as good as possible by the machining tolerances. FIGS. 1 to 4 illustrate a type of such a Kingdon swing ion trap with two inner electrodes (3) and (4) and a housing electrode which is split through the center into two symmetric half-shells (1) and (2). In all the figures, the ion trajectories (8) running both transversely and axially in the y-z plane are indicated schematically. The swing in transverse direction is non-harmonic; the oscillation in axial z direction is harmonic.

In the invention it is proposed to equip this Kingdon swing ion trap with a drill-hole (5) for the entrance of ions through one of the housing half-shells (1), and mounting a fine wire (7) in the drill-hole (5). The methods according to the invention allow the ions to be injected with low energy through this drill-hole (5), operating as a Kingdon ion guide, into the Kingdon ion trap.

The drill-hole (5) preferably has a small inside diameter relative to the diameter of the Kingdon ion trap, for example only about one to two millimeters when the maximum inside diameter of the housing electrodes is 50 millimeters. The wire (7) should have a very thin diameter of about 0.1 to 0.3 millimeters, for example, and is electrically insulated in the drill-hole (5) in the half-shell (1) of the outer housing electrode. The tip of the wire may be positioned in the interior of the drill-hole or may protrude into the interior by a few tenths of a millimeter. In the longitudinal direction, the drill-hole (5) is outside the minimum of the longitudinal potential well, i.e. outside the center plane of the Kingdon ion trap in the longitudinal direction (z-direction), namely as far removed from the center plane as the ions in the interior should oscillate. For a swing trap where the housing electrodes (1) and (2) have a maximum inside diameter of 32 millimeters and the interior is around 48 millimeters long, the drill-hole (5) can be located around 10 millimeters outside the plane of symmetry, for example; this results in longitudinal oscillations with an amplitude of about 20 millimeters.

The drill-hole (5) can be located exactly in the center plane of the two inner electrodes (3) and (4), i.e. in the plane in which the ions swing transversely in the y-direction; the drill-hole can also be shifted in the x-direction, slightly outside this y-z plane. It preferably points directly toward the longitudinal axis (z) of the Kingdon ion trap. If the drill-hole (5) is located a few millimeters outside the x-y plane, the plane of motion of the ions also oscillates slightly in a rotating motion about the z-axis, which has a positive effect on how long the entrance gate can be held open without ion losses.

The wire (7) in the drill-hole (5) is connected to a voltage generator which, on the one hand, can deliver a potential very similar to that of the housing electrodes (1) during the measurement phase and, on the other hand, during the ion introduction phase, can generate an intermediate potential between the potential of the housing electrodes (1) and that of the inner electrodes (3) and (4), more precisely between five and thirty percent, preferably around fifteen percent, of the operating voltage $\Delta U$ away from the potential of the housing electrodes (1) and (2). During the measurement phase, the potential is set so that the field inside the Kingdon ion trap in the vicinity of the drill-hole is perturbed as little as possible by the drill-hole and the wire. For operating voltages $\Delta U$ of one to ten kilovolts between the housing electrodes (1) and (2) and the inner electrodes (3) and (4), voltage differences of around 100 to 3,000 volts between housing electrodes and wire are applied to the wire. For preferred operating voltages $\Delta U$ of three to five kilovolts between housing electrodes and inner electrodes, the wire preferably has a voltage of 500 to 1,500 volts with respect to the housing electrodes during the phase of filling the trap with ions.

Figure 7:
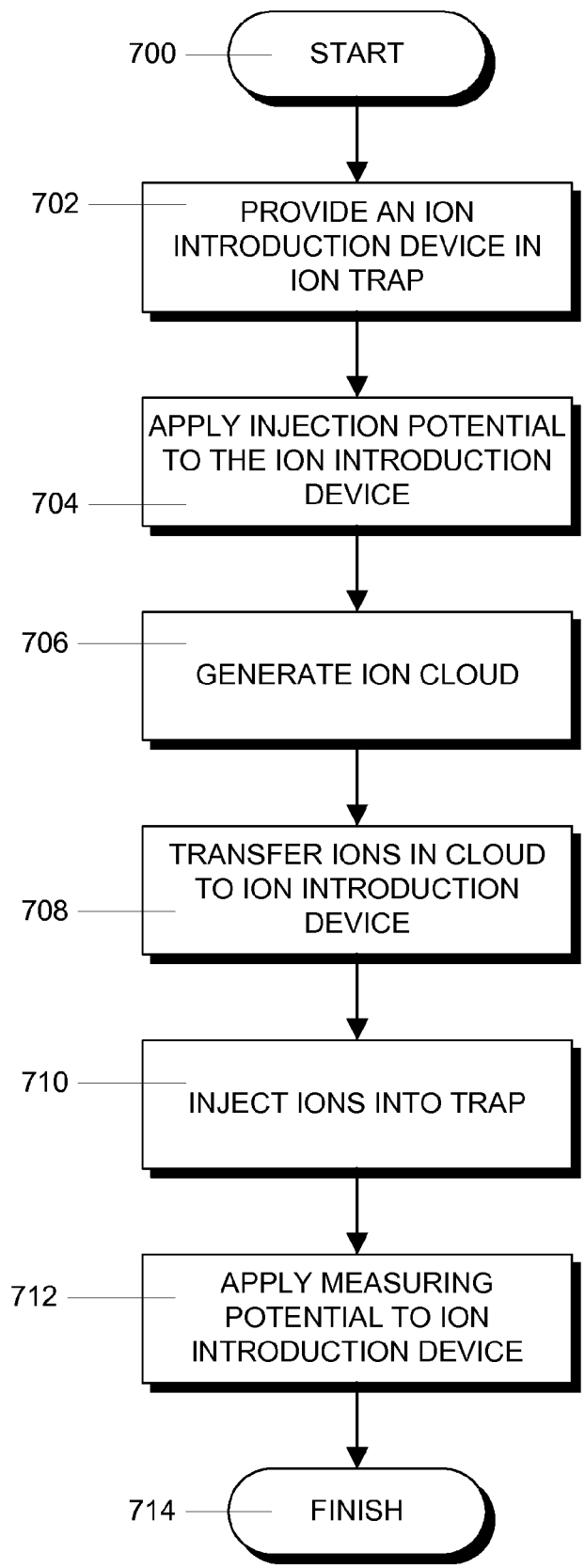
FIG. 7 is a flowchart showing the steps in an illustrative method for introducing ions into a Kingdon ion trap.

FIG. 7 shows the steps in one embodiment of an ion introduction method according to the principles of the invention. This method starts in step 700 and proceeds to step 702 where the Kingdon ion trap is provided with an ion introduction device as discussed above. During the beginning part of the method, in step 704, the aforementioned injection potential is applied to the central wire of the ion introduction device. Next, in step 706, a small ion cloud is generated. The small ion cloud can be produced by pulsed laser desorption from a solid sample, for example, and also by collecting analyte ions from any ion sources in two-dimensional or three-dimensional Paul ion traps. The cloud should be generated at a potential lower than that of the housing electrodes of the Kingdon ion trap; the ions then never can touch the housing electrodes once they are introduced in the ion trap. The ions in the ion cloud are transferred to the ion introduction device in step 708. The method initially accelerates the ions of the ion cloud, decelerates them again in front of the drill-hole (5) in a suitable ion-optical arrangement, and injects them with low kinetic energy of only a few tens up to a maximum of a few hundred electronvolts through the drill-hole (5) and into the Kingdon ion trap in step 710. The wire is at the intermediate potential here.

After entering, the ions in the Kingdon ion trap immediately move in both the transverse and the longitudinal direction, forming a complicated ion trajectory (8). A favorable geometrical aspect ratio of the Kingdon ion trap ensures that the ion trajectory closes again only after several oscillations in the longitudinal direction, after around six oscillations, for example, so that the ions can only then move close to the wire again and be removed there by contact or electric extraction.

As the ions are transferred, the path between ion cloud and Kingdon ion trap causes the ions to be time separated according to their mass by the mass-dependent flight times in electric acceleration, deceleration and focusing fields; the lighter ions reach the Kingdon ion trap earlier than the heavy ions. By making the time until the lightest ions of interest come near to the wire again as long as possible, on the one hand, and by high intermediate acceleration of the ions during the transfer to the Kingdon ion trap, on the other hand, it is possible for the heaviest ions of interest to also be introduced before the lightest ions in the Kingdon ion trap can again reach the wire (7). If, in step 712, the potential of the wire (7) is then again switched to the potential of the outer electrodes (1) and (2) (the measuring potential), all the ions remain firmly trapped on their trajectories within the Kingdon ion trap because they do not have enough kinetic energy to reach the housing electrodes (1) and (2). The introduction process then finishes in step 714.

If the ions survive six longitudinal oscillations until they reach again the wire (5), in a favorable configuration the ratio of lightest ions to heaviest ions which can be stored can be made to amount to about 1:36. This means that ions can be stored from a charge-related mass m/z=100 dalton to a mass m/z=3600 dalton, for example. This is an extremely wide mass range, more than a Paul RF ion trap can deliver.

The wire does not necessarily have to be switched quickly; an operating mode where the potential of the wire is changed slowly is also possible. In this operating mode, the potential of the wire may be slowly changed so that the light ions can no longer be extracted by the wire, but the heavy ions can still enter. This operating mode makes it possible to further extend the length of time for which the gate is open without ion losses. The gate is closed slowly, so to speak, in such a way that the light ions can no longer exit, but the heavy ones can still enter.

If the Kingdon ion trap must be emptied again after the longitudinal oscillations have been measured, this can be achieved by a suitable ejection potential at the wire (7) or at a special extraction electrode. Such an extraction electrode (46) is shown in FIG. 6 for orbit ion traps. Similar extraction electrodes can also be mounted in swing ion traps.

This type of ion introduction and ejection according to the objective of the invention means that the operating voltage between the outer and inner electrodes of the Kingdon ion trap never needs to be changed, but can be kept constant for all phases of operation. It is thus significantly easier to develop a voltage generator which provides this voltage with extremely low electronic noise and a constancy of much better than one millionth of this voltage.

The ion introduction method according to the invention is favorably performed if, at least temporarily, the ions to be introduced form a spatially small cloud. Such small ion clouds can be produced by matrix-assisted laser desorption (MALDI) from samples on a sample support, for example. Such laser-desorbed plasma clouds with ions contained therein are of a temporary nature, however, because they expand without any limitation by explosive expansion into the surrounding vacuum. They therefore have to be extracted by accelerating electrodes within the first nanoseconds, or microseconds at the latest, after their formation and moved to the Kingdon ion trap, where they are decelerated again to the entrance energy so that they can enter through the drill-hole (5) into the swing ion trap without being able to touch the walls of the drill-hole. The principle of this technique is known to those skilled in the art of mass spectrometry from MALDI time-of-flight mass spectrometers.

The small ion clouds required can also be produced in two-dimensional or three-dimensional Paul RF ion traps, however. FIG. 4 shows a three-dimensional ion trap with two end cap electrodes (28) and (30) and a ring electrode (29). Ions from any type of ion source can be guided to the ion trap via an RF ion guide (25) and injected through the acceleration lens (26). The ions oscillate in the interior in the known way under the influence of the pseudopotential; but their motions are then decelerated in about one millisecond by a damping gas at a pressure of about 0.01 pascal to such an extent that they collect in the center of the ion trap as a small cloud (27). The diameter of the cloud is determined by the centripetal effect of the pseudopotential, which is proportional to the RF voltage applied, and by the centrifugal effect of the Coulomb forces. For accumulation of a few ten thousand ions, being advantageous for Kingdon ion traps, ion cloud diameters of around one millimeter are produced in ion traps of conventional size, at moderate RF voltages of a few kilovolts.

This small ion cloud in the Paul ion trap can be extracted from the ion trap by an extraction voltage applied to the end cap electrode (30). When this is done, a focusing effect acts on the cloud, decreasing its diameter further. After being accelerated by the acceleration lens (31) and then decelerated again by the deceleration lenses (34, 35), the ions can then be introduced through the drill-hole (5) into the swing ion trap while the wire (7) is at the intermediate introduction potential.

In order to transfer the ions quickly from the point where the ion cloud is formed to the entrance of the drill-hole (5) and to compress the flight time differences between light and heavy ions, the ions of the ion cloud are initially strongly accelerated by the potential of the end cap electrode (30) and the acceleration lens (31), and decelerated again in front of the drill-hole (5) with wire (7) in a suitable ion-optical arrangement (34, 35). It is favorable here to inject the ion beam by the decelerating lenses (34, 35) into the Kingdon ion trap in a direction adjacent to the wire (7), as indicated in FIG. 4. Despite acceleration and deceleration, the ions are separated according to mass during the transfer by the different times of flight; the light ions reach the Kingdon ion trap earlier than the heavy ions, but the time difference is diminished.

The coupling of Kingdon ion traps according to the invention with Paul ion traps provides for interesting types of tandem mass spectrometer in which the Paul ion traps can be used to fragment or otherwise reactively change the ions in a wide variety of known ways, for the purpose of analyzing their structure, for example.

The optimum potential of the wire (7) during ion introduction should be determined experimentally. If, for example, the housing electrodes are at ground potential, and the inner electrodes at minus three kilovolts for the capture of positive ions, then the wire is preferably at a potential of minus 500 volts, and the ions are preferably injected into the drill-hole (5) around the wire (7) with a kinetic energy of about 200 electronvolts. Even when the kinetic energy of the ions has a relatively large spread of around plus/minus 100 electronvolts, the ions can neither reach the wall of the drill-hole (5) nor, in the interior of the swing ion trap, can reach the housing electrode at any point except the wire. A moderate spread of the ions' kinetic energies helps to smear out the ions over at least part of a translational motion cycle, which is advantageous for the measurement of the longitudinal oscillation.

After entering one of the swing ion traps of FIGS. 1 to 4, the ions immediately swing and oscillate in both the transverse and the longitudinal direction in the form similar to a Lissajous figure, which extends over a rectangle, in one of whose corners is the end of the wire (7). Since the oscillatory motion in the transverse direction is usually not harmonic, the Lissajous figures are slightly distorted. Since the electric field in the interior of the Kingdon ion trap is constant over time, all ions with the same initial kinetic energy follow exactly the same trajectories, regardless of their mass, but at different mass-dependent velocities. In order to have sufficient time to also store the heavy ions after the light ions have entered, without the light ions being able to leave the Kingdon ion trap again, the Lissajous figures must be formed in such a way that their ion trajectories can only reach the entrance drill-hole with the wire again after several, preferably about four to six, oscillations in the longitudinal direction. Lissajous figures with this shape are made possible by the geometric elongation of the Kingdon ion trap, or to be more precise, by the ratio of length to diameter of the interior of the swing trap. This aspect ratio can be selected so that the Lissajous figure only closes again after several oscillations in the longitudinal direction, about ten oscillations, for example, and therefore the ions can only then come close to the wire again and be destroyed.

In conventional Kingdon ion traps, the ratio of the transverse to the longitudinal oscillation frequencies is about 2:1 to about 6:1. With an integral ratio of 2:1, and also with integral ratios of 3:1, 4:1, 5:1 or 6:1, the Lissajous figure closes again after a single longitudinal oscillation, and the ions can be destroyed after this single longitudinal oscillation. This is unfavorable because only very little time then remains to also introduce heavier and slower ions into the Kingdon ion trap without the light ions being discharged by contact with the wire.

In order to gain a longer time for the introduction of the heavier ions, it is advantageous to generate, by the aspect ratio, exactly $(n \times k+1)/n = k+(1/n)$ transverse oscillations during one longitudinal oscillation. The Lissajous figure then closes again only after $n \times k+1$ transverse and n longitudinal oscillations. For example: If one sets up precisely 4.1 transverse oscillations per longitudinal oscillation, the Lissajous figure closes only after 41 transverse oscillations, which is equal to 10 longitudinal oscillations. The ions can only be lost after 10 longitudinal oscillations because only then do the ions again reach the vicinity of the wire. With precisely 4.2 transverse oscillations per longitudinal oscillation, the Lissajous figure closes after 21 transverse oscillations, amounting to five longitudinal oscillations. This is a very favorable situation.

The ratio of the oscillation frequencies can be set by means of the aspect ratio, i.e. the ratio of the length to the diameter of the interior of the swing ion trap. An advantageous aspect ratio for a swing ion trap can be calculated relatively easily and very successfully with one of the commercially available simulation programs for ion motions in any electrode arrangement (e.g. "Simlon"). These programs are well-known to those skilled in the art of mass spectrometry. The mechanical shape of the swing ion trap should only be designed after these simulation experiments.

We have seen that it is possible to ensure that the heaviest ions of interest are introduced before the lightest ions can be destroyed or extracted, despite the mass separation resulting from the different times of flight. This is achieved by means of the designable length of time until the Lissajous figure closes and by the compression of the flight time differences by intermediate acceleration of the ions from the ion cloud. If, after introduction of the ions of interest, the potential of the wire is switched back to the potential of the outer electrodes, all the ions remain firmly trapped on their complicated oscillating trajectories, which are mainly in one plane.

If the drill-hole (5) is not inserted precisely in the plane between the inner electrodes of the swing trap, the additional motion in the x-direction can also be used to prolong the time until the ions return to the wire.

In the descriptions above, the wire was only put "approximately" at the potential of the housing electrodes for the measuring phase, i.e. not at the exact potential of the housing electrodes. It is better to select a potential which deviates a little (about five percent of the operating voltage $\Delta U$ at most) from the potential of the housing electrodes, in order to bring the electric field in the vicinity of the drill-hole, whose aperture slightly disturbs the field, back to its theoretically ideal form, as far as possible. This corrective potential at the wire will be termed "measuring phase potential".

Before the measurement of the longitudinal oscillations for which the measuring phase potential is applied, it can be advantageous to use an "interfering potential" at the wire to smear ions of the same mass, preferably over roughly one motion cycle of the transverse motion in order to reduce the influence of this motion on the measurement of the image currents.

With this type of ion introduction, it is possible to avoid changing the operating voltage of the Kingdon ion trap during the ion introduction and measurement. There remains the step of emptying the swing trap of all the ions it contains, however. In order that the operating voltage between the housing and inner electrodes does not need to be changed in this emptying step either, a possible solution is to also effect the emptying by applying an "emptying voltage" to the wire. This voltage can preferably deviate even more strongly from the potential of the housing electrodes in order to capture and extract all passing ions. This again requires n longitudinal oscillations of the heaviest ions in order for all ions to pass the wire and be extracted; to be certain, however, the time taken is extended to complete 2n or 3n longitudinal oscillation cycles of the heaviest ions.

Analogous considerations apply to the introduction of ions into an orbit trap, except that, in this case, the mean kinetic energy on injection corresponds to that which keeps the ions on the desired orbit. Such an orbit trap is shown in FIGS. 5 and 6. Here, also, the number of transverse orbits k of the ions can be selected in relation to the number n of their longitudinal oscillations by elongating the orbital trap. The aspect ratio here again refers to the ratio of a characteristic length to the maximum inside diameter of the housing electrodes. The characteristic length can be given here by the distance between the two z-coordinates at which the housing electrodes have an inside diameter which corresponds precisely to half the maximum inside diameter, for example. For this orbital trap it can be advantageous, for example, to use the aspect ratio to select exactly 4.2 transverse orbits to one longitudinal oscillation because, then, the ions can only reach the location of the wire again, and be extracted, after five longitudinal oscillations. If the wire is switched to the potential of the housing electrodes (or to a "measuring phase potential" defined analogously) shortly beforehand, the ions remain trapped.

In FIG. 5 it can be clearly seen that the drill-hole (45) in the interior of the orbit trap is cut at a steep angle, creating a partly open channel through which the ions enter. In the open part of the channel, the attractive electric field of the inner electrode already exerts a weak effect, and bends the ion beam approximately so that it approaches the path of the orbital motion at a tangent. If the ideal trajectory of the orbit is not completely achieved, a potential can be set by using an additional auxiliary electrode (46) which brings the ions precisely to their orbit. This auxiliary electrode (46) can also particularly be used to remove the ions from the orbital trap again after the image current transient has been measured. This involves the application of a special emptying potential. The emptying again takes at least n cycles of the longitudinal oscillation of the heaviest ions, but avoids any change to the highly stable operating voltage between housing and inner electrode.

To measure the image current transients in both types of Kingdon ion trap, the housing electrodes are split transversely into two half-shells, for example the half-shells (1) and (2) of the swing trap. Both half-shells of the housing electrodes are preferably at ground potential and serve as detection electrodes for the image currents. The image currents are best measured with amplifiers at ground potential; albeit this is not irrevocably necessary. But it is also possible for the housing electrodes to be at a high, ion-repelling ambient potential, while the inner electrodes (3) and (4) are essentially at ground potential and, transversely split at the center, are connected to the image current amplifier for measuring the ion oscillations in the longitudinal direction z.

Higher operating voltages ΔU between inner and housing electrodes result in faster oscillations and improved mass resolution, but also make it more problematic to develop a voltage generator with high operating stability and low noise. As has already been mentioned, the operating voltage must be kept extremely stable; a mass accuracy of one millionth of the mass (1 ppm) requires an operating voltage ΔU which is at least equally stable.

FIG. 4 represents a particularly interesting arrangement in which a Paul RF ion trap (28, 29, 30) is coupled to a Kingdon swing ion trap (1, 2, 3). The Paul ion trap can be charged with ions from any type of ion source: electrospray ion sources (ESI), ion sources with chemical ionization at atmospheric pressure (ACPI), ion sources with photoionization at atmospheric pressure (APPI), and also ion sources with matrix-assisted laser desorption (MALDI). The Paul ion trap shown in FIG. 4 can also be used to analyze the ions without the aid of the Kingdon swing ion trap, by ejecting the ions mass-selectively in the known way and measuring them by means of the arrangement of conversion dynode (32) and secondary electron multiplier (33). The disadvantage of this type of mass analysis, however, is its limited mass resolution; a mass resolution of a satisfactory quality can, however, be achieved by coupling the Paul ion trap to the Kingdon ion trap.

The Paul ion trap has the great advantage that, in its interior, the ions can be fragmented in a wide variety of ways by different types of reaction, or otherwise reactively manipulated, in order to better identify the structure of the ions from the fragment ions or the reaction product ions, for example. In the interior of the Paul ion trap, parent ions can be selected and isolated in the known way, by removing all other ions. The parent ions can then be fragmented using a number of different methods, for example by collisions with the molecules of a collision gas (CID=collisionally induced dissociation), by collisions with atomic ions of opposite polarity, or by fragmenting reactions with suitable ions of different polarity (ETD=electron transfer dissociation). The masses of the daughter ions resulting from these fragmentations can then be measured in the Kingdon ion trap with high mass resolution and high mass accuracy, and thus provide information on the structure of the ions, for example the sequence of the amino acids in protein ions.

A particularly advantageous mass spectrometer using the Kingdon ion traps according to the invention can therefore comprise not only the Kingdon ion trap but also an ion source and a Paul ion trap, from which the ions are transferred through the drill-hole into the Kingdon ion trap. In the Paul ion trap, the ions can be stored intermediately, selected according to their mass and isolated, fragmented in a variety of ways, or reactively changed.

The Kingdon ion traps used here are relatively small in order to prevent the voltages between the electrodes from becoming too large. The distance between the two inner electrodes (3) and (4) of a swing ion trap is thus preferably less than 50 millimeters, and ideally only about 10 millimeters. The maximum inside diameter of the external electrodes (1) and (2) is preferably less than 200 millimeters; advantageous is a value of around 50 millimeters. An advantageous length for the housing electrodes is less than 200 millimeters, preferably around 100 millimeters. A mass spectrometer for this invention can therefore be very compact.

The size of the configuration is fundamentally determined by the ultrahigh vacuum system required, however. A pressure difference of about six orders of magnitude must be maintained between the two ion traps of FIG. 4. A pressure of around $10^{-1}$ pascal must be maintained in the Paul ion trap, and around $10^{-7}$ pascal in the Kingdon ion trap. This can only be achieved if at least two differential pressure stages, with wall openings as small as possible for the passage of the ions, are inserted between the two ion traps. For reasons of clarity, these differential pressure stages are not shown in FIG. 4.

It is very simple for persons skilled in the art to derive further interesting applications using the methods according to the invention for the introduction of ions into Kingdon ion traps of the types according to the invention. These shall also be covered by this patent protection application for the part which is subject to this invention.

What is claimed is:

1. A Kingdon ion trap having a plurality of housing electrodes arranged along a longitudinal direction and a DC field, generated by an operating voltage between the housing electrodes and one or more inner electrodes, the inner electrodes being shaped so that ions in the trap can oscillate harmonically in a potential well in the longitudinal direction, substantially decoupled from their motion in a direction transverse to the longitudinal direction, wherein a chosen one of the housing electrodes has an ion introduction device in the form of a Kingdon ion guide that comprises a drill-hole through the chosen electrode and a wire which is insulated from the chosen electrode and positioned within the drill-hole.

2. The Kingdon ion trap of claim 1, further comprising an injection lens located outside the ion introduction device and outside the ion trap and configured so that the injection lens injects ions into a space between the wire and a wall of the drill-hole.

3. The Kingdon ion trap of claim 1, wherein the wire is surrounded by a tube located outside of the chosen housing electrode and outside of the ion trap.

4. The Kingdon ion trap of claim 3, wherein the tube is made from permanently magnetic material.

5. The Kingdon ion trap of claim 1, wherein the drill-hole and wire are located at a distance away from a minimum of the potential well that is substantially equal to a maximum oscillation amplitude in the longitudinal direction experienced by the ions after the ions have been introduced into the ion trap.

6. The Kingdon ion trap of claim 1, wherein the wire has a diameter substantially between 0.05 to 0.3 millimeters.

7. The Kingdon ion trap of claim 1, wherein the drill-hole in the chosen housing electrode has a diameter substantially between 0.5 to 1.5 millimeters.

8. The Kingdon ion trap of claim 1, wherein the drill-hole in the chosen housing electrode has one of a cylindrical, conical and trumpet shape.

9. The Kingdon ion trap of claim 1, wherein a geometric aspect ratio of the ion trap is selected so that, after introduction, ions return to the location of the ion introduction after three to ten longitudinal oscillations.

10. The Kingdon ion trap of claim 1, further comprising a voltage generator that maintains the operating voltage ΔU between the inner electrodes and the housing electrodes.

11. The Kingdon ion trap of claim 10, further comprising an additional voltage generator connected to the wire that generates on the wire at least one of a measuring phase potential, which differs from the potential of the housing electrodes by at most five percent of the operating voltage $\Delta U$, and a variable injection potential, which differs from the potential of the housing electrodes by five to thirty percent of the operating voltage $\Delta U$.

12. A method for the introduction of ions into a Kingdon ion trap having a plurality of housing electrodes arranged along a longitudinal direction and a DC field, generated by an operating voltage between the housing electrodes and one or more inner electrodes, the inner electrodes being shaped so that ions in the trap can oscillate harmonically in a potential well in the longitudinal direction, substantially decoupled from their motion in a direction transverse to the longitudinal direction, comprising:
(a) providing an ion introduction device in the form of a Kingdon ion guide that comprises a drill-hole through a housing electrode and a wire which is insulated from that housing electrode and positioned within the drill-hole;
(b) applying to the wire a variable injection potential, which differs from the potential of the housing electrodes by five to thirty percent of the operating voltage;
(c) generating an ion cloud outside of the Kingdon ion trap;
(d) transferring ions from the ion cloud to the drill-hole by accelerating that ions and subsequently decelerating the ions so that ions of different charge-related masses m/z arrive at the drill-hole at different times due to different times of flight;
(e) injecting the transferred ions through the drill-hole into the Kingdon ion trap; and
(f) switching the injection potential applied in step (b) to a measuring phase potential which differs from the potential of the housing electrodes by at most five percent of the operating voltage when heaviest ions of interest have entered the Kingdon ion trap.

13. The method of claim 12, wherein step (d) comprises injecting the ion cloud into a space between a wall of the drill-hole and the wire.

14. The method of claim 12, further comprising:
(g) performing a measurement on ions in the ion trap; and
(h) after the measurement in step (g) is complete, applying a potential to the wire to remove ions from the ion trap.

15. The method of claim 12, wherein the ion cloud is produced by laser desorption.

16. The method of claim 12, wherein the ion cloud is produced by trapping ions generated by any type of ion source in one of a two-dimensional and a three-dimensional Paul ion trap.

17. The method of claim 16, wherein trapped ions are isolated, fragmented or otherwise reactively manipulated in the Paul ion trap to determine their structure before the contents of the Paul ion trap are transferred into the Kingdon ion trap.

18. A mass spectrometer, comprising:
an ion source that generates ions;
a Paul ion trap that receives ions from the ion source and collects the ions; and
a Kingdon ion trap having a plurality of housing electrodes arranged along a longitudinal direction and a DC field, generated by an operating voltage between the housing electrodes and one or more inner electrodes, the inner electrodes being shaped so that ions in the trap can oscillate harmonically in a potential well in the longitudinal direction, substantially decoupled from their motion in a direction transverse to the longitudinal direction, wherein a chosen one of the housing electrodes has an ion introduction device in the form of a Kingdon ion guide that comprises a drill-hole through the chosen electrode and a wire which is insulated from the chosen electrode and positioned within the drill-hole and that receives at least a portion of the contents of the Paul ion trap.

* * * * *